Dec. 25, 1962 G. P. CANEVARI 3,070,359
VAPOR-LIQUID CONTACTING APPARATUS
Filed May 29, 1958

Gerard P. Canevari    Inventor

By *Richard J. J. Nagel*

Attorney

United States Patent Office 3,070,359
Patented Dec. 25, 1962

3,070,359
VAPOR-LIQUID CONTACTING APPARATUS
Gerard P. Canevari, 11 Pine St., Metuchen, N.J.
Filed May 29, 1958, Ser. No. 738,741
11 Claims. (Cl. 261—113)

The present invention relates to an improved apparatus and process for countercurrently contacting vapors and liquids. More particularly, the present invention relates to an improved fractionation zone and contacting tray involving a novel self-refluxing principle and dispensing with the necessity of downcomers. Still more particularly, the present invention relates to a fractionation tray having substantially increased capacity and efficiency over those presently available. In accordance with the present invention, a portion of the tray liquid is recycled by entraining it into the rising vapors from a lower tray by means described in detail below.

It is well known to carry out many reactions and separations wherein vapors and liquids are contacted in a countercurrent manner, such as in a hydrocarbon fractionation or asphalt oxidation zone. Normally, the liquid passes from one zone to a lower zone by means of downcomers or their equivalents while the vapors pass upwardly from zone to zone through chimneys in the train, around various types of bell caps into the liquid phase disposed on the top of the tray. The liquid phase passes from zone to zone over weirs on the respective trays into downcomers and passes onto the tray in the zone below. In this arrangement vapor is simply bubbled through liquid and the tray efficiency is limited by this basic method.

More recently downcomerless trays have been employed more widely, for instance the sieve tray and the like. These have a distinct economic advantage in that the entire volume of the tower is available for contacting. However, these too in essence simply bubble upflowing vapor through liquid and have not proved too satisfactory in either efficiency or capacity. Also, since in these types of downcomerless trays, the vapor and liquid share a common path, i.e. the perforations alternately permit liquid then vapor flow, the range of stable operation of these downcomerless trays is limited. Slight irregularity or curvature in the tray surface to, in a sense, effect peaks and valleys, cannot alter the random flow of the liquid and vapor through the perforations. The establishment of such separate, stable paths for liquid and vapor is one of the important objects of the present invention.

It is a further important object of the present invention to provide an improved type liquid-vapor contact device for a fractionating column or the like in which the velocity of the rising vapors is effectively utilized to improve the contact between vapor and liquid so that a more efficient fractionation results.

A further object of the present invention is to provide a fractionation column or the like with a liquid-vapor contacting device by means of which rising vapor entrains recycled liquid at high velocity to cause the liquid on each deck or plate to form a highly comminuted spray so that intimate mixing of the vapors with the liquid and a thorough circulation of the liquid in each plate are obtained.

Further objects and advantages of the present invention will appear from the following description of a preferred embodiment thereof taken in conjunction with the attached drawing, wherein—

Figure 1:
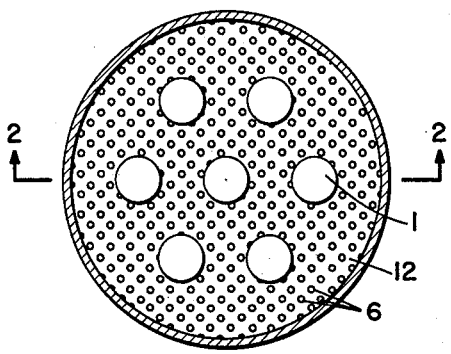
FIGURE 1 is a horizontal sectional view of the fractionating column, taken along the line 1—1 of FIGURE 2.

In accordance with the present invention, there is illustrated a fractionating column which is provided with a plurality of spaced fractionating plates or decks 12 for the collection of downflowing liquid thereon so that establishment of the appropriate equilibrium conditions between the rising vapors and the liquid can be approached.

For efficiency in fractionation of a mixture it is necessary that an intimate mixing of the vapors with the liquid trapped on each plate be obtained. It is the intimacy of contact of the rising vapors with the downflowing liquid that determines the degree of fractionation accomplished. The improved contact device of the present invention provides this.

In accordance with the present invention, a plurality of uptake conduits or caps 1 are arranged on tray 12 in somewhat the same distribution that bubble caps are found on a conventional tray. These conduits 1 of any desired cross-sectional shape, preferably cylindrical, are fastened in any suitable manner to plate 12. The caps 1, which may be, in one embodiment, 2 inches to 6 inches in height, preferably 4 inches, are provided with two levels of a plurality of apertures, such as holes, one level near the top and the second at or near the base. The tops of the caps are imperforate. The holes near the upper level are small, of the order of ⅛ inch in diameter. The lower level of holes may be somewhat larger, of about ¼ to 1 inch diameter. The imperforate spacing between the two levels represents about 50 to 90% of the total length of the cap. The ratio of the vapor aperture area in the top of the cap to the liquid aperture in the tray proper may be .5 to 2.

In operation, vapor passes through the upper level of holes into the foaming region of tray 12. This foaming region normally extends some 2 to 18 inches above the top of cap 1 and represents the zone wherein entrained recycle liquid is disengaged from the uprising vapor stream. The liquid level on tray 12 is maintained corresponding to the top row of holes in conduit 1.

Because of the lower back pressure due to lower static head, the rising vapors passing through cap 1 preferentially pass through the upper level of holes 3. Liquid trapped on the surface of tray 12 flows into the lower level 4 of cap 2, and a substantial portion is immediately entrained by the rising vapor stream. On entrainment, the liquid is impacted with great force on the imperforate top 5 of cap 2 and is atomized into exceedingly fine droplets.

As the vapors and atomized liquid droplets pass out through holes 3 they pass into the foam or disengaging space, coming into most intimate contact with that phase.

The maintenance of a frothing region above the liquid level on the tray is an important element in the process of the present invention. It is there that the finely dispersed liquid is disengaged from the vapor so that it is not entrained to the tray above. This frothing region also effects additional contacting over and above that obtained in the cap. The density of the foam may be of the order of one-third to one-half of the quiescent liquid beneath. Hence there is little back pressure for the vapor to overcome in passing through the tray.

Because of the greater static head on the lower row 4 of perforations in cap 1, liquid preferentially passes through this level of holes. This liquid is ejected horizontally into the high velocity rising vapor stream. Some of this liquid is therefore entrained by the vapor and is then returned to the tray. The contact of the rising vapor with the descending liquid and entrained liquid thus causes the entire volume of the tower to take part as effective fractionating volume. There is thus established a continuous liquid recycle on the tray, the amount and extent of which can be controlled by the number, size and shape of the apertures in the cap, the number, size and shape of the caps, and the elevation of the holes. The distance between the holes or slots where rising vapor passes through on its upward path and the lower holes which pass liquid is preferably such to allow liquid head to be somewhat higher than pressure drop through the vapor circuit.

Figure 3:
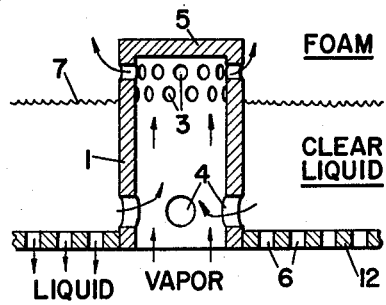
FIGURE 3 is an enlarged vertical sectional view of the contacting device of the present invention.
Figure 2:
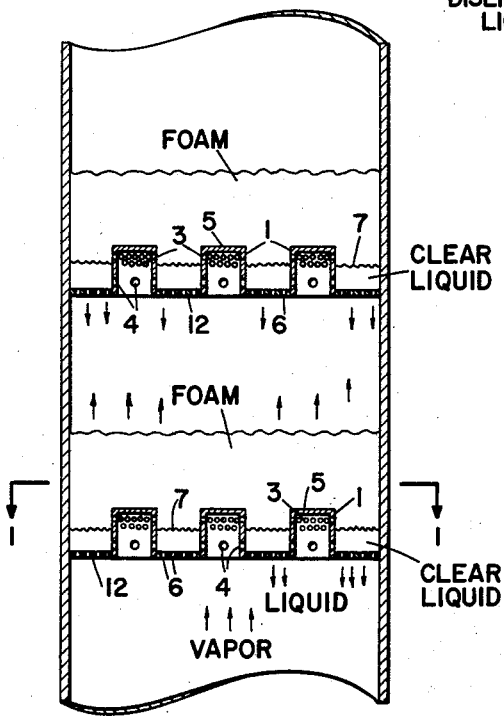
FIGURE 2 is a vertical section through a fractionating column taken along the line 2—2 of FIGURE 1.

The maintenance of the critically important frothing region for the design depicted in FIGURES 1, 2 and 3 is effected by the design pressure balance of the tray. The vapor pressure drop through the tray is dependent principally on the size and number of holes 3 and the size and number of caps 1. In one embodiment, the distance of the lowest level of holes 3 is 3 inches above the tray proper 12. The pressure drop of vapor through the tray due to the constriction of holes 3 and cap 1 is 3½ inches of water column. In addition to this, there is also a restriction to liquid flow due to the pressure drop of the liquid passing through holes 6 in the tray proper 12. An additional pressure drop of ½ inch of water column through these holes 6 hence results in a total pressure drop of the tray of 4 inches of water column. Therefore, liquid equivalent to 1 inch of water would normally be resident above the lowest level of the upper plurality of holes 3. Vapor would therefore be injected into this liquid through holes 3 to develop the frothing region.

The size of the caps or chimney is such that the vapor carries the entrained liquid upward with sufficient force to atomize it by almost explosive impact against the top of the caps and return it to the vapor or foam space above the tray for further vapor contact. Thus as the liquid passes downward from the tray above, it contacts vapor in the foam space and settles on the tray 12. Liquid level is maintained on the tray due to pressure drop of vapor passage, and it is from this reservoir that liquid is supplied to recycle holes 4 in the caps.

The main body of the liquid reservoir, after having been fully contacted with vapor in the froth region, now passes through the holes 6 in the tray proper. Of course, some part of this liquid has also been recycled and superfractionated in the cap 12, which, in this sense, acts as a very efficient contacting chamber. The liquid now proceeds, well distributed throughout the cross-section of the tower, to the tray below and enters into its frothing region. The holes 6, in the perforate tray proper, may be ⅛ inch in diameter to 2 inches diameter and may assume shapes other than circular holes.

In operating with the tray of the present invention, two major advantages are realized over operating with trays presently available, namely a better hydraulic performance and better contacting of vapor with liquid. Superior hydraulic performance is realized by the fact that the liquid and vapor paths have been optimized in such a manner as to avoid loss in contacting. Since there is now a quiescent settling zone on the bottom of the tray through which no vapor bubbles, a clear disengaged liquid level is established. This greatly helps as a driving force for the liquid since the density of this liquid is three times that of the foam found on sieve and other perforated type trays. The vapors do not have any greater back pressure to offset than they would in a conventional sieve tray.

The better contacting is obtained by the highly turbulent mixing and contacting that takes place in the cap. Here liquid is entrained since the cap velocity is five to ten times normal tower vapor velocity. At this high cap vapor velocity, the entrained liquid is smashed against the top of the cap with almost explosive violence. Then, after the slug of liquid has been atomized in this manner, it leaves the cap together with the vapor by "squeezing through" ⅛ inch diameter holes. Normal bubbling contact (as in conventional trays) then occurs in the froth region. Hence, all contacting in the cap is in addition to the bubbling contact in the froth.

In effect, an improvement in all three of the major design criteria of good fractionating device is obtained by the present invention with no attending disadvantages. These are increased capacity, lower pressure drop and better fractionation. An improvement in vapor handling capacity of 25 to 100% over conventional trays, i.e. bubble cap, sieve, etc., can be realized at constant liquid loadings. Conversely at constant vapor loadings, liquid loadings can be increased from 2,500 gal./hr./sq. ft., a limiting condition for most trays, to 5,000 gal./hr./sq. ft.

It has been experimentally determined that the tray pressure drop at these increased loadings is actually only about one-fourth the tray pressure drop for conventional trays.

By the interpolation of related hydrocarbon contacting data, an improvement of 100 to 350% in contacting can be obtained. The importance of this heretofore unobtainable degree of fractionation can be realized by the inspection of such services as hydrocarbon absorbers where present day tray efficiencies are limited to a mere 20%.

Although the finely atomized liquid in mixture with the gas would normally present a serious problem as regards entrainment to the tray above, by the maintenance of the frothing region this liquid is disengaged and returned to the tray proper. The froth region is maintained by a hydraulic balance whereby the normal liquid level 7 of the quiescent region is slightly above the lowest of the vapor outlet holes 3. This is a minimum limit for good operating conditions. The maximum limit occurs when the top of the froth region approaches the tray above. The ratio of this maximum limit to the minimum limit determines the tray flexibility. In instances where very wide flexibility is necessary, the lowest level of the vapor holes 3 may be lowered to permit frothing at lower loadings.

Conventional downcomerless trays have experienced difficulty with flexibility because of the difficulties in making accurate calculations and designs for the random type liquid and vapor flow and because of the inherently narrow band of stable tray operation.

The self-refluxing principle detailed and described above may, of course, be also realized in cap shapes other than cylindrical. In addition to changes in the configuration and shape, modifications in the vapor and liquid ports may also be employed.

Figure 4:
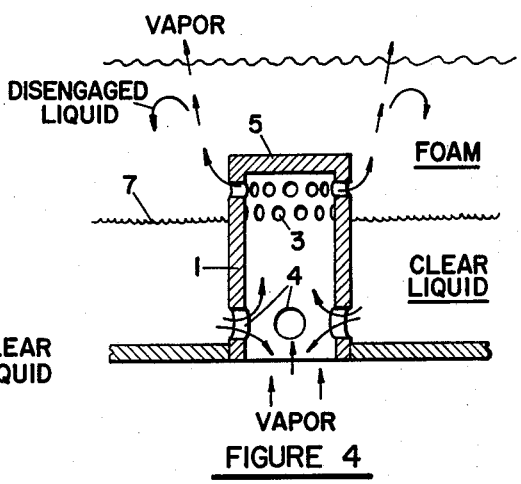
FIGURES 4 and 5 represent modifications of the contacting device.

In another modification of the present invention, an imperforate rather than a perforate tray may be employed. This modification is shown in FIGURE 4. Extremely efficient vapor-liquid contact is here assured by the provision that all liquid pass from one tray to the tray below by passage through the lower aperture 4, of the cap. That portion of the liquid flowing from the liquid level 7 through aperture 4 and not entrained in the upflowing vapor stream thus passes to the tray below for further contact with uprising vapor. The static head on the lower row of perforations provides for the rate of passage of liquid through these holes and the amount of liquid recycle on the tray. By controlling the size, number and location of the lower liquid apertures 4, any rate of liquid recycle may be secured.

Figure 5:
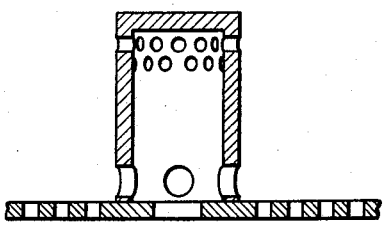

In FIGURE 5 there is shown a cap design whereby the tray is extended under the base of the cap to neck down the vapor inlet, thus increasing the vapor velocity. This feature insures liquid entrainment at very low tower vapor velocity.

The present invention may be adapted to all types of fractionating towers. In existing towers its use increases capacity and operational stability, and in new designs its use will permit a more economical size relationship between tray and tower volume. Thus because of the higher vapor velocity and more intimate mixing, a column of small diameter may be employed.

What is claimed is:

1. In a fluid contacting apparatus, a tower having at least one downcomerless, perforated tray, a plurality of cap elements arranged on said tray, each of said caps having an imperforate top surface and two vertically spaced series of perforations on the lateral surface.

2. The apparatus of claim 1 wherein said caps are cylindrical.

3. The apparatus of claim 1 wherein the spacing between the upper level and lower level of said perforations is in the range of 50 to 90% of the total length of said cap.

4. The apparatus of claim 1 wherein said perforations in said upper level are substantially smaller than said perforations in said lower level of the lateral surfaces of said caps.

5. The apparatus of claim 1 wherein said imperforate top surface is a flat surface at right angles to said lateral surface of said cap.

6. The apparatus of claim 1 wherein said lateral surface defines the boundary of said imperforate top surface.

7. The apparatus of claim 1 wherein the ratio of the aperture area of the upper series of perforations to the aperture area of the lower series of perforations is 0.5 to 2.0.

8. An improved process for contacting liquids with vapors comprising upwardly flowing a vapor stream and substantially horizontally injecting a liquid stream into short, narrow, vertical paths, passing said vapor and liquid stream upwardly through each of said paths, impinging said vapor and liquid stream against an imperforate surface at the top of each of said paths to form liquid droplets of said liquid stream, maintaining a vapor-liquid froth zone adjacent to said paths, passing said vapor and liquid droplets laterally into said vapor-liquid froth zone, passing vapor upwardly from said froth zone, returning liquid to said liquid zone, and recycling at least a portion of said returned liquid.

9. The process of claim 8 wherein said vapor and liquid droplet stream flows laterally from said paths through a series of perforations, said perforations determining the size of the liquid droplets flowing into said vapor-liquid froth zone.

10. The process of claim 8 wherein said liquid stream is injected into said paths under a liquid and vapor-liquid froth hydrostatic head, through a series of perforations in the lower portion of said paths.

11. In a liquid-vapor contacting apparatus, a tower having at least one downcomerless, perforated tray, a plurality of cap elements opening through said tray, said tray having a liquid thereon and a vapor passing upwardly thereto, said liquid having a liquid level, said cap elements having an imperforate top surface and a lateral surface, said lateral surface having an upper series and a lower series of perforations, said upper series of perforations being disposed at about said liquid level, said lower series being disposed at a distance below said liquid level such that said liquid passes through said lower series of perforations.

References Cited in the file of this patent

UNITED STATES PATENTS

| | | |
|---|---|---|
| 1,613,352 | Kobernik | Jan. 4, 1927 |
| 1,744,134 | Morrell | Jan. 21, 1930 |
| 1,904,380 | Morrell et al. | Apr. 18, 1933 |
| 2,523,126 | Long | Sept. 19, 1950 |
| 2,767,966 | Chave | Oct. 23, 1956 |
| 2,767,967 | Hutchinson | Oct. 23, 1956 |
| 2,803,528 | Erdmann | Aug. 20, 1957 |